United States Patent [19]
Wittig

[11] Patent Number: 5,127,286
[45] Date of Patent: Jul. 7, 1992

[54] ADJUSTMENT DEVICE FOR SEATS

[75] Inventor: Werner Wittig, Winnweiler, Fed. Rep. of Germany

[73] Assignee: Keiper Recaro GmbH & Co., Fed. Rep. of Germany

[21] Appl. No.: 649,312

[22] Filed: Jan. 31, 1991

Related U.S. Application Data

[63] Continuation of Ser. No. 308,625, Feb. 10, 1989, abandoned.

[30] Foreign Application Priority Data

Feb. 12, 1988 [DE] Fed. Rep. of Germany ....... 3804352

[51] Int. Cl.$^5$ .................... G05G 1/10; B60N 2/02
[52] U.S. Cl. .................... 74/553; 74/573 R; 297/362
[58] Field of Search .............. 74/553, 558, 572, 574, 74/10.80, 10.52; 297/362, 347; 296/65.1, 63, 66; 16/121, DIG. 30

[56] References Cited

U.S. PATENT DOCUMENTS

| | | | |
|---|---|---|---|
| 1,744,330 | 1/1930 | Mull | 74/10.52 |
| 2,658,395 | 11/1953 | Coates | 74/10.52 |
| 3,246,537 | 4/1966 | Earl et al. | 74/572 |
| 3,315,633 | 4/1967 | Rabinow | 74/553 X |
| 3,396,604 | 8/1968 | Samuels et al. | 74/553 X |
| 3,878,731 | 4/1975 | Huegli | 74/553 X |
| 3,958,463 | 5/1976 | Block et al. | 74/10.52 X |
| 4,094,210 | 6/1978 | Wirtz et al. | 292/347 X |
| 4,345,792 | 8/1982 | Shephard | 297/362 |
| 4,346,624 | 8/1982 | Nagasaki et al. | 475/341 |
| 4,641,887 | 2/1987 | Klueting | 297/362 |
| 4,791,823 | 12/1988 | Williams | 74/553 X |
| 4,986,514 | 1/1991 | Ikegaya et al. | 297/362 |
| 4,986,602 | 1/1991 | Blanchard | 297/362 |

FOREIGN PATENT DOCUMENTS

| | | | |
|---|---|---|---|
| 2604489 | 8/1976 | Fed. Rep. of Germany | 297/362 |
| 3516714 | 11/1986 | Fed. Rep. of Germany | 297/362 |
| 3729134 | 3/1989 | Fed. Rep. of Germany | 297/362 |
| 1464102 | 2/1977 | United Kingdom | 74/572 |
| 1528673 | 10/1978 | United Kingdom | 74/572 |
| 1582997 | 1/1981 | United Kingdom | 74/573 F |
| 1597760 | 9/1981 | United Kingdom | 74/573 F |
| 2186051 | 8/1987 | United Kingdom | 74/572 |

Primary Examiner—Vinh T. Luong
Attorney, Agent, or Firm—Wigman & Cohen

[57] ABSTRACT

An adjustment device for seats, particularly motor vehicle seats, having a transmission, particularly a planetary gear transmission, and further including a drive shaft (2) which can be rotated by a drive device (4) coupled therewith. The mass moment of inertia acting on the drive shaft (2) can be increased by at least one mass body (15) that is operatively connected with the drive shaft (2).

6 Claims, 2 Drawing Sheets

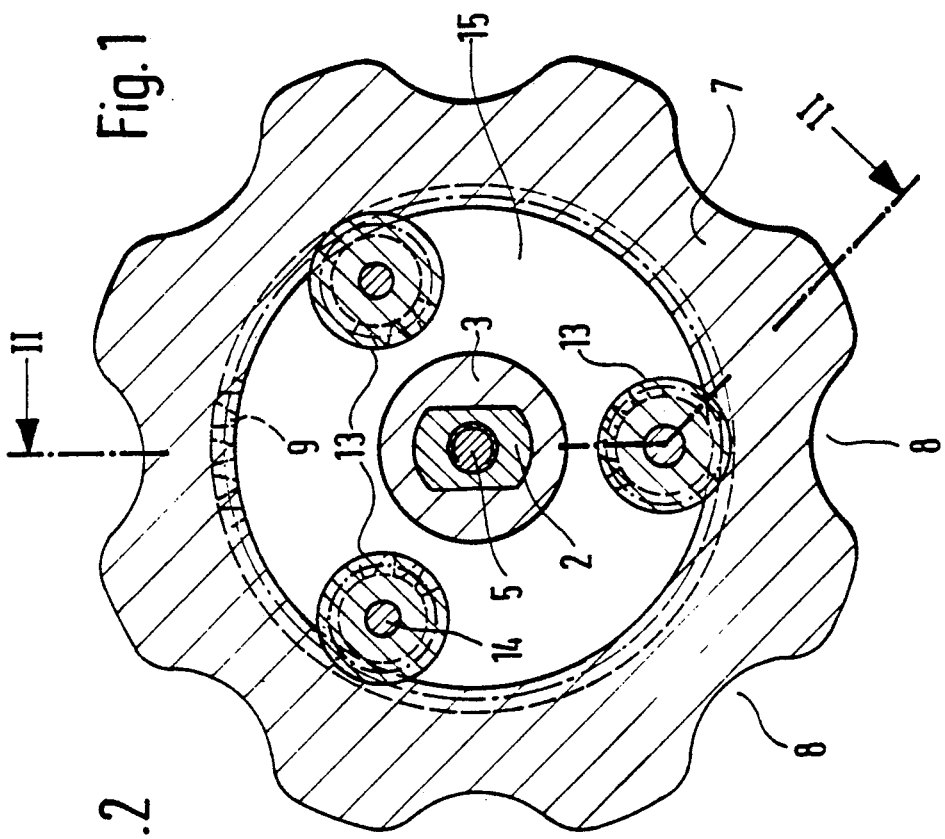
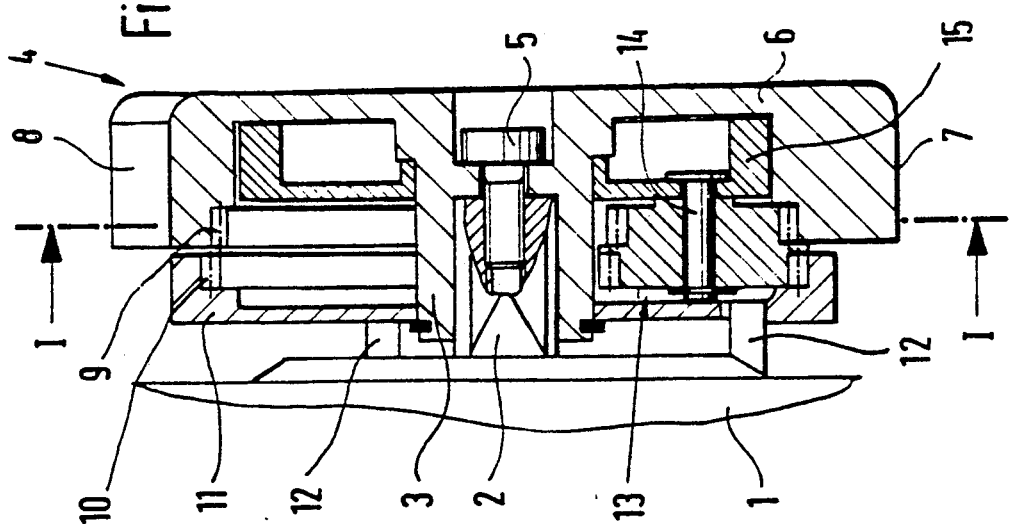

ADJUSTMENT DEVICE FOR SEATS

This is a continuation of application Ser. No. 308,625, filed on Feb. 10, 1989, abandoned.

BACKGROUND OF THE INVENTION

1. Field of the Invention

The invention relates to an adjustment device for seats, particularly vehicle seats, having gears, particularly a planetary gear, the drive shaft of which can be rotated by means of a drive device that is coupled thereto.

2. Description of the Prior Art

In a vehicle seat provided with a known hinge fitting having a self-retarding adjustment gear, if the drive shaft of the adjusting gear is driven downward in the sense of a pivoting of the back rest, then the back rest follows the rotary movement of the adjustment gear discontinuously. The safety of the seat user is not reduced in any way due to an overlapping oscillation of the back rest resulting from the discontinuous pivot motion. Nevertheless, the discontinuous movement of the back rest is often found to be bothersome, at least partially because of the chattering noise associated therewith. This is also true for seat height adjustment devices having at least one self-retarding adjustment gear.

OBJECTS AND ADVANTAGES OF THE INVENTION

A principal object of the invention, therefore is to provide an improved adjustment device of the type described above which eliminates or substantially reduces the chattering noises of an adjustment structural element, used for example, in connection with a back rest to effect a downward pivoting movement. Another object of the present invention is to provide an adjustment device with improved noise reducing characteristics having a planetary gear transmission with a drive shaft of increased inertial mass.

SUMMARY OF THE INVENTION

Tests have confirmed that an increase in the inertial mass acting on the gear drive shaft acts to reduce chattering. Chattering therefore can not only be reduced but practically eliminated if the inertial mass acting on the drive shaft is sufficiently large. A particular advantage of the present invention is the fact that the stated objects are achieved by mechanical means that are simple and economic.

Because the effective mass moment of inertia with which the mass body moves during a rotational movement of the drive shaft does not change linearly but quadratically with velocity, in one preferred embodiment the mass body is not arranged rigidly on a the drive shaft or on a shaft that rotates with it. Instead, a transmission connection is formed between the drive shaft and the mass body by a set of gears that has a gear ratio that increases the rotational velocity of the mass body relative to the rotational velocity of the drive shaft. Although a gear transmission of this type increases production costs, it results in significant reductions in space and weight requirements. As a rule, the use of this type of transmission allows the dimensions of the mass body to be chosen small enough that housing it in the available space is not difficult. There is also the additional advantage that the parts of the gear transmission contribute to the increase in the effective mass moment of inertia. The mass body can therefore be integrated into the drive device, particularly into a hand knob serving as a drive device, at least if it rotates significantly more rapidly than the drive shaft of the transmission, without having to enlarge the external dimensions of the drive device. Integration into the transmission is also possible without, for example, having to appreciably enlarge the dimensions of a hinge fitting serving as the adjustment device.

If a connecting shaft extends from a first adjusting device to a second such device, for example, laterally in the direction of the seat from one hinge fitting to the other, then the mass body can also be arranged on this connecting shaft.

If a hand knob is provided as the drive device, forming a hollow chamber in which an annular element can be arranged as the mass body, another embodiment is provided wherein the two crown gears in which each provided pinion simultaneously engages lie axially adjacent to each other. In such embodiment, the variation range of the realizable gear ratio is very large. This variation range is smaller when the two crown gears are arranged coaxially to each other and each of the provided pinions lies between the two crown gears. This embodiment has a minimal production cost.

BRIEF DESCRIPTION OF THE DRAWINGS

The invention is described in greater detail below with the aid of two exemplary embodiments illustrated in the drawings, wherein:

FIG. 1 is a cross-section of the first exemplary embodiment taken along the line I—I of FIG. 2;

FIG. 2 is a longitudinal section through the first exemplary embodiment taken along the line II-II of FIG. 1.

DETAILED DESCRIPTION OF THE PREFERRED EMBODIMENT

Figure 3:
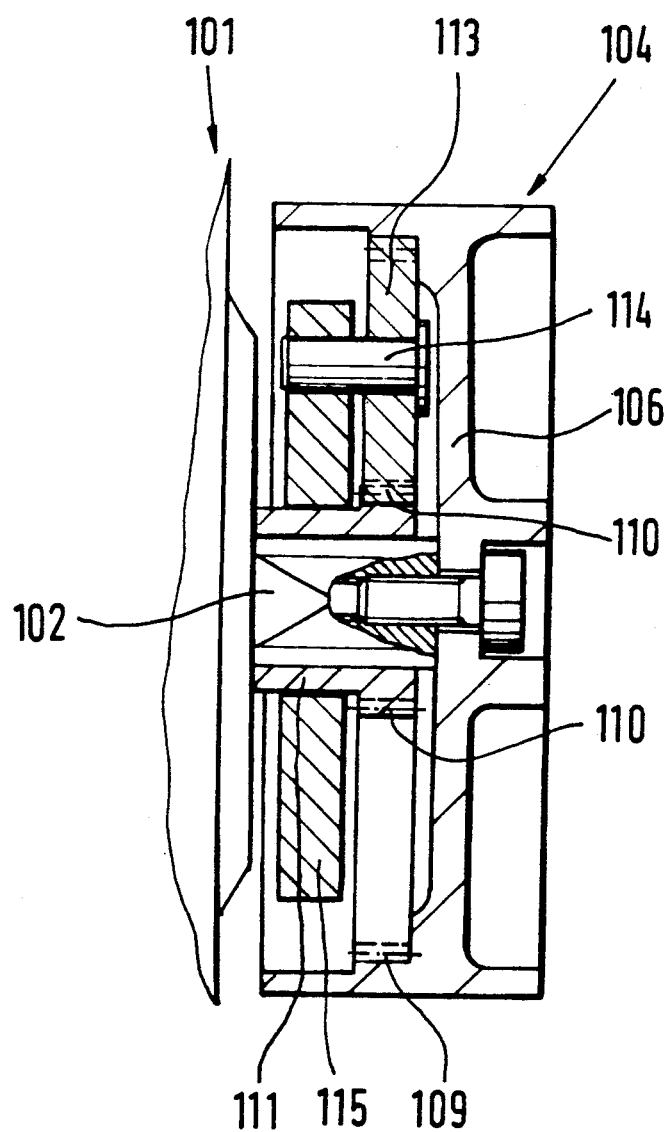
FIG. 3 is a longitudinal section through the second exemplary embodiment.

As seen in FIG. 2, hinge fitting 1 is formed in a known manner and is therefore not illustrated in detail. Fitting 1 connects the back rest of a vehicle seat with the bench portion thereof and includes an upper hinge portion to be connected with the upholstery support of the back rest and a lower hinge portion to be connected with the bench frame or with the upholstery support of the bench portion, which are connected with each other in an articulated manner by an eccentric bolt 2, commonly called a drive shaft, of a planetary gear. This self-retarding planetary gear forms the adjustment gear by means of which the upper hinge portion can pivot relative to the lower hinge portion and can be set in any selected pivot position.

In the area of its end section projecting over the hinge elements, the eccentric bolt 2 is provided in a known manner with two diametrically opposite flat areas, which provide a secure rotational connection between the eccentric bolt 2, and the hub 3 placed thereon, of a hand knob designated generally by numeral 4. A flange 6 on the side opposite the hinge fitting is formed on the hub 3, and is secured against axial shifting by means of screw 5. The outer edge area of the flange 6, like the outer surface of a hollow, cylindrical element 7 of the hand knob 4 abutting the flange 6, is provided with grip grooves 8 running in an axial direction which facilitate a secure grip on the hand knob 4. In the exemplary embodiment the hollow cylindrical element 7 is formed in one piece on the side of the flange 6 facing the hinge elements.

The end section of the hollow, cylindrical element 7 facing the hinge elements supports on its inner side a first crown gear 9. Adjacent to this first crown gear 9, on the side facing the hinge elements, is a second crown gear 10, positioned in annular disc 11. Annular disc 11 is arranged coaxially to the eccentric bolt 2 and is connected with the lower hinge element of the hinge fitting so as to rotate therewith by means of bar-like connection elements 12 arranged parallel to the eccentric bolt 2. As shown in FIG. 2, the diameter of the second crown gear 10, which like the first crown gear 9, has teeth on its inside, and is somewhat larger than the diameter of the first crown gear 9.

Three identical pinions 13, displaced relative to one another by 120 degrees, simultaneously engage with the two crown gears 9 and 10. Due to the different diameters of the two crown gears 9 and 10, these pinions 13 have two axially adjacent sets of teeth which are adapted to the first and second crown gears, respectively, as shown in FIG. 2. Alternatively, the two crown gears 9 and 10 can also have the same diameter but with different numbers of teeth. In that case, the diameters of the outer sets of teeth of the pinions are of equal size. The pinions 13 are rotatably arranged on respective stud bolts, each of which supports a spring ring on its free end in order to secure the pinions 13 against axial shifts.

The stud bolts 14 are supported by a mass body 15 that is rotatably mounted on the hub 3. In the exemplary embodiment, the mass body 15 has the shape of an annular disc that projects into the annular space between the first crown gear 9 and the flange 6. Each pinion 13 may include an additional mass body. The mass body 15 can fill this space to a greater or lesser degree, depending on the required mass moment of inertia.

The two crown gears 9 and 10, together with the pinions 13, form a planetary gear transmission that effects the angular velocity of the mass body 15 during rotational movement of the hand knob. This angular velocity, according to the selected gear ratio, which may be 1:10 for example, is greater than the angular velocity of the hand knob 4. The mass moment of inertia of the pinions 13, which roll on the second crown gear 10 during rotational movement of the hand gear 4 and drive the mass body 15 around the eccentric bolt 2 with the rotary speed of the stud bolts 14, is added to that of the mass body 15. The mass moment of inertia acting on the eccentric bolt 2 smoothes out the movement of the upper hinge element connected therewith during an adjustment of the position of the back rest to such an extent that the chattering which would occur without the presence of mass body 15 and the transmission gears driving it is at least reduced to an extent that it is no longer bothersome.

In the exemplary embodiment illustrated in FIG. 3, the hinge fitting 101, like that in the first exemplary embodiment, is formed in a known manner and is therefore not illustrated in detail. The hand knob 104 is secured solidly to the eccentric bolt 102 which connects the two hinge elements of the hinge fitting 101 with each other. What is necessary is that there is a space concentric to the eccentric bolt 102 that is open toward the hinge fitting 101.

A mass body 115 shaped like an annular disc is arranged in this space, and is rotatably mounted on the sleeve 111 to obtain the smallest possible amount of friction. Body 115 is also mounted on the inner wall of the hand knob 104. A crown gear 109 with teeth provided on its inner side is provided on the hand knob 104 axially adjacent the mass body 115, namely in the exemplary embodiment adjacent to the side opposite the hinge fitting 101 and thereby between the mass body 115 and the flange 106 of the hand knob 104. This crown gear 109 corresponds with the first crown gear 9 of the first exemplary embodiment according to FIGS. 1 and 2. A second crown gear 110 with outside teeth is provided radially inside the crown gear 109 on a sleeve 111 that concentrically surrounds the eccentric bolt 102 with play. Sleeve 111 is securely connected with the lower hinge element of the hinge fitting 101. Three pinions 113 that are displaced relative to each other by 120 degrees engage the crown gear 109 and the second crown gear 110. The pinions 113 are rotatably mounted on respective stud bolts 114 that are arranged parallel to the eccentric bolt 2. The stud bolts 114 are securely set in the mass body 115 each having an annular collar on its free end that secures the pinion 113 in an axial direction.

In the exemplary embodiment according to FIG. 3, rotating the hand knob 104 causes the pinions 113 to roll on the second stationary crown gear 110. In this manner the stud bolts 114 revolve about the eccentric bolts 102, and do so with an angular velocity which, in accordance with the gear ratio of the gear transmission formed by the two crown gears 109 and 110 as well as the pinions 113, is greater than the angular velocity of the eccentric bolt 102. The mass moment of inertia of the mass body 115 and the pinions 113 acting on the eccentric bolt 102 also in this exemplary embodiment provides the required reduction in the chattering.

Other transmission structures may also be used and may eventually be even more advantageous. For example, the mass body need not be exclusively arranged in the hand knob.

With a centrifugal mass, particularly one that is coupled to the adjusting device by means of a gear transmission, chatter noises that occur during use of a motor as a drive device can also be reduced or completely suppressed. Thus, the mass body that serves as the centrifugal mass can be arranged, for example, on the engine drive shaft. This is particularly advantageous where a transmission is present between the motor and the adjusting device that reduces the rotational velocity.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An adjustment device for use in vehicle seats, said adjustment device comprising: a drive shaft of a first transmission, which drive shaft can be rotated by means of a hand knob coupled therein, said hand knob having a recess therein; a mass body means operatively connected with said drive shaft, for increasing the effective mass moment of inertia of said drive shaft, wherein said mass body means is positioned in said hand knob recess and is formed as an annular element arranged concentrically to said drive shaft supporting said hand knob; said annular element supporting at least one pinion having an axis which is parallel to said drive shaft and eccentric thereto, said pinion meshing with a first crown gear provided on said hand knob and also with a second crown gear that is securely connected with one hinge element to form a second transmission which serves as a non-retarding planetary gear transmission.

2. Adjustment device according to claim 1, wherein a mass moment of inertia of said at least one pinion cooperates with said annular element so as to be combined with a mass moment of inertia of said annular element.

3. Adjustment device according to claim 1, wherein said mass body means is rotatably supported by said hand knob.

4. Adjustment device according to claim 2, wherein said at least one pinion and said annular element are rotatably supported by said hand knob.

5. Adjustment device according to claim 1, wherein said hand knob has a flange formed in one piece and a cylindrical element that surrounds said mass body means, and supports the first crown gear adjacent to the side of said mass body means facing the hinge element.

6. Adjustment device according to claim 5, wherein said second crown gear is provided on a support disc that is connected with one of the two hinge elements of the hinge fitting by means of connecting elements.

* * * * *